US006980839B2

(12) United States Patent
daCosta

(10) Patent No.: US 6,980,839 B2
(45) Date of Patent: Dec. 27, 2005

(54) APPARATUS, SYSTEM AND METHOD FOR USE IN POWERING ON A REMOTE WIRELESS DEVICE

(75) Inventor: Behram daCosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 3 days.

(21) Appl. No.: 10/697,366

(22) Filed: Oct. 23, 2003

(65) Prior Publication Data

US 2004/0219955 A1 Nov. 4, 2004

Related U.S. Application Data

(60) Provisional application No. 60/467,381, filed on Apr. 30, 2003.

(51) Int. Cl.[7] ................................................ H04B 1/00
(52) U.S. Cl. ........................ 455/574; 455/572; 370/338
(58) Field of Search ................................ 455/574, 572, 455/434, 414.1, 403, 407, 408, 229, 230; 370/315, 338, 343, 349, 390

(56) References Cited

U.S. PATENT DOCUMENTS

| 5,648,955 | A |  | 7/1997 | Jensen et al. |
| 5,870,389 | A |  | 2/1999 | Hadar et al. |
| 5,887,255 | A |  | 3/1999 | Jackson et al. |
| 5,933,421 | A |  | 8/1999 | Alamouti et al. |
| 5,943,618 | A |  | 8/1999 | Jackson et al. |
| 5,978,674 | A |  | 11/1999 | Jackson et al. |
| 5,995,492 | A |  | 11/1999 | Klein et al. |
| 6,023,460 | A |  | 2/2000 | Jackson et al. |
| 6,023,621 | A |  | 2/2000 | Jackson et al. |
| 6,097,704 | A |  | 8/2000 | Jackson et al. |
| 6,208,855 | B1 | * | 3/2001 | Tanaka .......................... 455/59 |
| 6,501,420 | B2 | * | 12/2002 | Townsend et al. ......... 342/357.1 |
| 6,560,209 | B1 |  | 5/2003 | Alamouti et al. |
| 6,584,080 | B1 | * | 6/2003 | Ganz et al. ................... 370/315 |
| 6,658,240 | B1 | * | 12/2003 | Ries ........................ 455/183.1 |
| 6,690,655 | B1 | * | 2/2004 | Miner et al. ................. 370/278 |
| 6,697,415 | B1 | * | 2/2004 | Mahany ....................... 375/130 |
| 6,721,547 | B2 | * | 4/2004 | Husted et al. ............ 455/226.1 |
| 6,842,445 | B2 | * | 1/2005 | Ahmavaara et al. ......... 370/349 |
| 6,856,612 | B1 | * | 2/2005 | Bjelland et al. ............. 370/338 |
| 2004/0218602 | A1 | * | 11/2004 | Hrastar ........................ 370/390 |
| 2005/0078649 | A1 | * | 4/2005 | Tehrani et al. ............... 370/343 |

* cited by examiner

Primary Examiner—CongVan Tran
(74) Attorney, Agent, or Firm—Thomas F. Lebens; Fitch, Even, Tabin & Flannery

(57) ABSTRACT

A method, apparatus, and system for use in providing wireless communication while reducing power consumption includes an in-band system and an out-of-band system, wherein the out-of-band system receives an out-of-band wireless communication and activates the in-band system causing the in-band system to transition from a sleep mode to an activate mode. The in-band system is maintained in the sleep mode. When an out-of-band communication is received, the out-of-band system activates the in-band system such that the in-band system transition from the sleep mode to the active mode. The out-of-band system can further verify the in-band system is an intended target of the out-of-band communication such that the in-band system is activated when the in-band system is verified as the intended target by transmitting an out-of-band identification request, and receiving an out-of-band reply containing an identification.

20 Claims, 5 Drawing Sheets

APPARATUS, SYSTEM AND METHOD FOR USE IN POWERING ON A REMOTE WIRELESS DEVICE

This application claims the benefit under 35 U.S.C. 119(e) to U.S. Provisional Application No. 60/467,381, filed Apr. 30, 2003, entitled POWER-ON OF REMOTE WIRELESS DEVICES USING OUT OF BAND SIGNALING, which U.S. Provisional Patent Application is hereby fully incorporated herein by reference.

FIELD OF THE INVENTION

The present invention relates generally to wireless communication, and more particularly to the powering up of a remote apparatus.

BACKGROUND OF THE INVENTION

In wireless networks such as 802.11 based wireless local area networks (WLAN), a wireless communication device, such as a station or access point can wirelessly communication with a remote device of the network, such as another station or the same or an alternate access point. This communication often occurs when the remote device is not otherwise being used. However, in present 802.11 implementations, the remote device being targeted is to be maintained in a completely powered on state or mode, with its radio, related wireless chips, host processor, and related components powered on, in order to monitor the communication channels for packets directed towards the target device.

Alternatively, the remote device may operate in a low power mode where some of the components of the 802.11 medium access controller (MAC) may be powered down but the radio and the remainder of the system and much of the host device (e.g., host processor) typically need to be at least partially powered up. The power consumption of the 802.11 radio, the remainder of the system and the host device utilize a significant amount of power and significantly limit the operating time of hosts powered by batteries or cells.

In low power mode a device typically would need to periodically transition to the fully active mode to check for packets directed to the device. As a result, the device has additional power requirements and further drains portable power supplies.

SUMMARY OF THE INVENTION

The present invention advantageously addresses the needs above as well as other needs through the provision of the method, apparatus, and system for use in providing wireless communication while reducing power consumption. The apparatus includes an in-band system providing wireless communication, wherein the in-band system has an active mode and a sleep mode, and an out-of-band system providing wireless communication is coupled with the in-band system, wherein the out-of-band system receives an out-of-band wireless communication and activates the in-band system causing the in-band system to transition from the sleep mode to the activate mode. The out-of-band system can include a controller, such that a least a portion of the out-of-band wireless communication is directed to the controller and the controller activates the in-band system causing the in-band system to transition from the sleep mode to the activate mode. The controller can further transmit a transmit out-of-band communication.

In some embodiments, a method for use in wireless communications is provided. The method includes maintaining an in-band system in a sleep mode, receiving an out-of-band communication, activating the in-band system in response to the out-of-band communication, and transitioning the in-band system from the sleep mode to an active mode. The receiving the out-of-band communication includes receiving the out-of-band communication through an out-of-band system. The maintaining the in-band system in the sleep mode includes completely powering down the in-band system. The method can further include verifying the in-band system is an intended target of the out-of-band communication, and initiating the activation of the in-band system when the in-band system is verified as the intended target, where the verifying the in-band system is the intended target includes transmitting an out-of-band identification request, and receiving an out-of-band reply containing an identification. In some embodiments, the out-of-band communication is modulated with a different modulation scheme than a modulation scheme for an in-band wireless communication.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
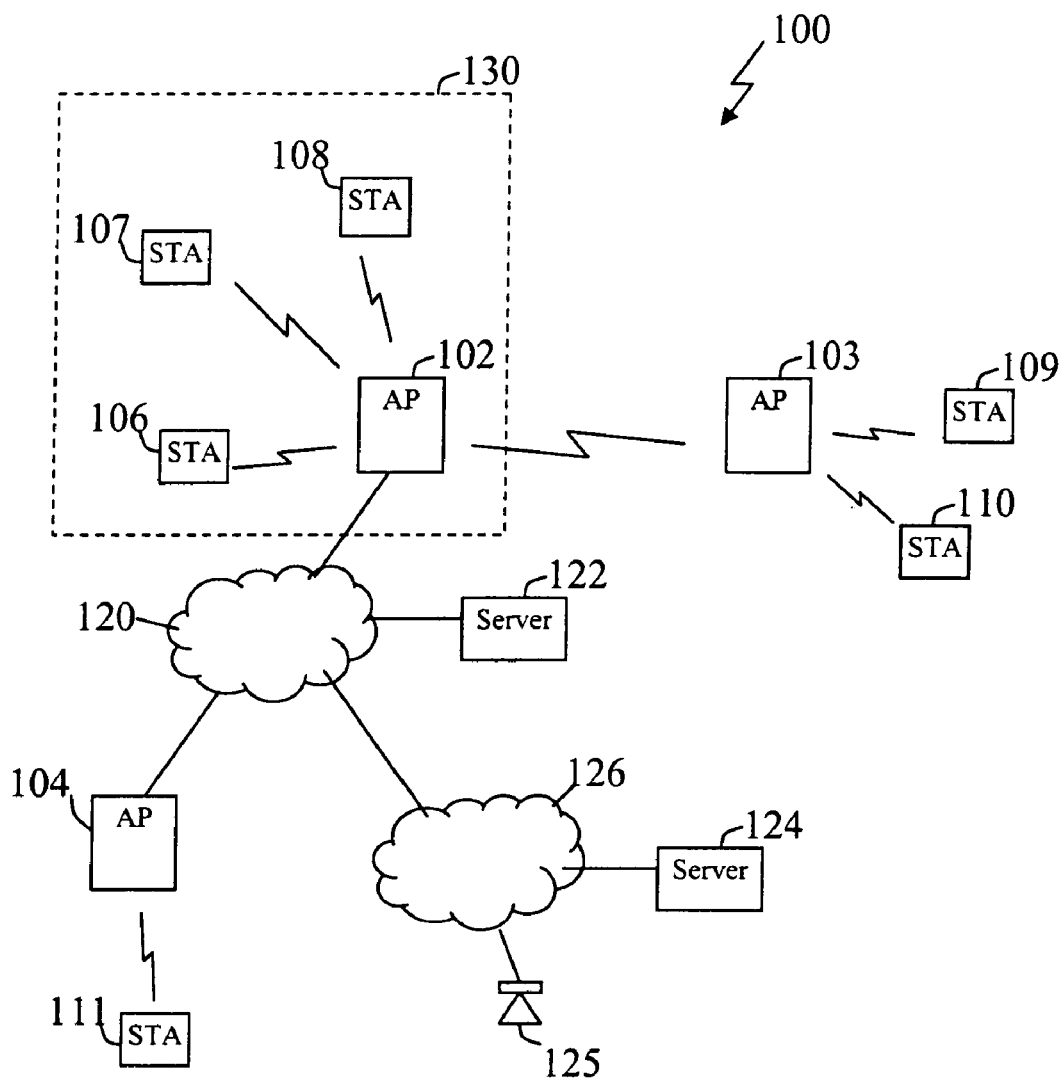
FIG. 1 depicts a simplified block diagram of a network according to one embodiment where at least some of the components communicate over wireless channels.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

These various embodiments provide systems, apparatuses and methods for use in wireless communication to improve power consumption. These embodiments utilize an out-of-band (out-of-band) control channel to notify one or more wireless devices that one or more in-band wireless communication(s) are prepared to be communicated to the one or more devices. This out-of-band signaling triggers the one or more wireless devices to activate circuitry to receive the in-band wireless communication(s), such as communications conforming to the 802.11 standards. The use of the out-of-band control channel allows wireless communication devices to incorporate a simple out-of-band receiver to receive the out-of-band notification and to trigger the power up and/or activation of an in-band communication system. The simplified out-of-band receiver operates with minimal power consumption. Further, because the out-of-band receiver detects and notifies the in-band wireless communication system, the wireless communication device can operate at a significantly reduced power level, and preferably be completely powered down.

In wireless networks, such as wireless networks implementing 802.11 standards (e.g., 802.11 based wireless local area networks (WLAN)) and other similar wireless networks, one device of the network wirelessly communicates with another device of the network. In the operation of wireless networks, periods of time and often long periods of time pass where devices of the network will not receive wireless communications and/or will not transmit wireless communications. As a result, wireless communications are often directed to one or more devices that are not otherwise being used at that time.

In previous 802.11 communication devices, a receiving device is typically completely powered on, with its radio, related wireless chips, host processor and related components powered on, in order to monitor in-band channel(s) for packets directed towards the device. Some devices can be configured to enter a sleep mode or low power mode, where some wireless communication components of the 802.11 medium access controller (MAC) architecture of the receiving device may be temporarily powered down (e.g., components can be powered down 500–600 ms for every second). However, the radio components and the rest of the system for receiving in-band wireless communications (such as the microprocessor) need to be at least partially powered up. Typically, the host or main processor of the device has to additionally be completely powered up. For example, a laptop configured to communicated wirelessly typically must keep the central processor (e.g., Pentium processor) fully powered up. Maintaining the receiving device fully powered on and/or the wireless communication components of the receiving device powered on results in relatively significant power consumption. This is a significant problem for devices powered from batteries and/or cells, such as mobile wireless devices. The power drain on batteries can significantly limit the operating time of battery powered devices.

In some devices utilizing previous 802.11 chipsets, a wireless communication device can consume, for example, roughly 1.5 W of power when the device is completely powered on or in a high power mode in order to receive communications and/or await communications to be directed to the device. Some wireless devices that can operate in a low power mode can reduce power consumption to about 100 mW of power while in the low power mode awaiting communication. These wireless devices with low power modes typically power up to the high power mode periodically to check for packets directed to the wireless device causing additional power consumption. This additional power consumption is usually wasted power because frequently the device is not receiving communications. Additionally, wireless devices with low power modes typically maintain a host system (such as a host microprocessor and other related components) in the completely powered on state while other components of the wireless device are in the low power mode.

The present invention provides methods, systems and apparatuses for use in reducing power consumption for wireless devices, such as wireless devices communicating over a wireless LAN network or other similar wireless networks. FIG. 1 depicts a simplified block diagram of a network 100 according to one embodiment. The network includes one or more access points (AP) 102–104. Each access point wirelessly communicates with one or more stations or wireless devices (STA) 106–111. The stations can be mobile stations or can be fixed stations. In some embodiments, an access point (e.g., access point 102) can wirelessly communicate with one or more other access points (e.g., access point 103). In some embodiments, a station may communicate directly with one or more stations.

The access points further couple with one or more wired networks 120, such as the Internet, an intranet, a public switched telephone network (PSTN), integrated services digital network (ISDN) and/or other similar networks. The access point is capable of communicating with external devices over the network 120, such as servers 122 accessed over the Internet, access points 104 of other sub-networks, other devices 124–125 of other wired or wireless networks 126 (such as intranets, a PSTN, an ISDN, cellular networks and other similar networks).

Typically, an access point 102–104 provides control of wireless communication for a wireless sub-network 130. The access point 102 controls and forwards communications to and from the sub-network. This allows communication between devices external to the sub-network 130 and the stations 106–108. Further, the access point can provide a wireless communication link between stations within a sub-network. A sub-system 130 can be substantially any wireless network, such as an in-home wireless network, a wireless campus network, a cellular communication network (e.g., a cellular phone network) or other similar wireless networks. The access point 102 can be a central or client device access point providing control over the sub-network 130. The stations 106–108 can be substantially any wireless device configured to communicate with the AP, such as a computer, a wireless phone, a set-to-box, video gaming console (e.g., Sony PlayStation™ and the like) and other similar devices configured to wireless communicate with and through the AP. For example, the station 106 can be a portable computer (e.g., laptop) wirelessly accessing the Internet 120 through the access point 102. A station can also communicate directly with another station.

Figure 2:
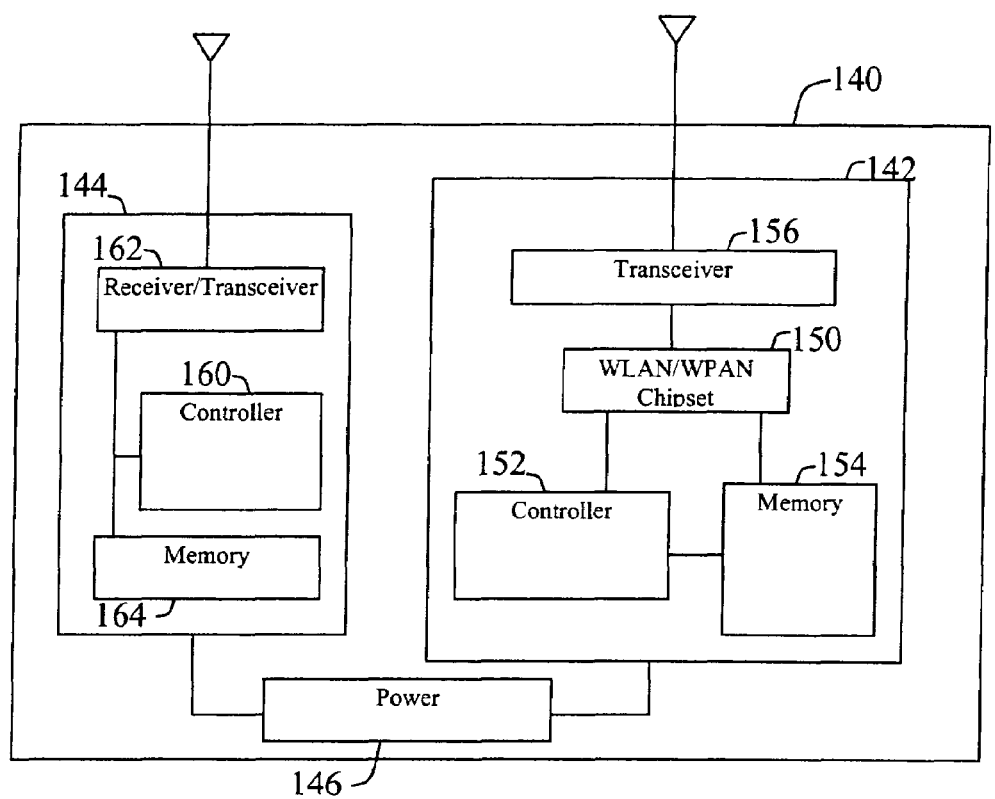
FIG. 2 depicts a simplified block diagram of a station 140 according to some embodiments that can be implemented in the network of FIG. 1.

FIG. 2 depicts a simplified block diagram of a station 140 according to some embodiments that can be implemented in the network of FIG. 1. The station includes an in-band communication system 142 and an out-of-band communication system 144. Each of the in-band and out-of-band systems provides wireless communication to and/or from the station 140. An access point 102–104 of the wireless system 100 can additional be configured to include an in-band system 142 and out-of-band system 144, similar to that shown in FIG. 2. It will be apparent to those skilled in the art that the in-band and out-of-band systems 142, 144 can be incorporated into substantially any wireless communication device to reduce power consumption.

The in-band system 142 can include a wireless LAN (WLAN) or wireless personal area network (WPAN) chipset 150. The chipset couples with one or more transmitters, receivers and/or transceivers 156 that wirelessly transmit and/or receive in-band wireless communications. The chipset 150 can provide formatting, decoding, encoding and other similar processing for wireless communication according to the standard(s) utilized by the wireless network and/or sub-network (e.g., network 100 and/or sub-network 130, respectively). The in-band system 142 provides wireless communication through the transceiver 156 according to predefined parameters. Typically these parameters are defined by the standard followed for providing the communication, such as IEEE 802.11. If the station 140 is wirelessly communicating according to the 802.11 standard, the chipset 150 transmits and receives data over regular 802.11 communication in-band channels and within predefined bandwidths as defined by the 802.11 standard (e.g., between 2.40 GHz and 2.50 GHz).

An in-band controller 152 couples with the chipset 150 to provide further control over the chipset as well as over the in-band system 142. The controller can be implemented through a processor, microprocessor, computer or other similar controller(s). In some embodiments, the controller 152 is the host device controller and/or microprocessor. Alternatively, in some embodiments, the in-band controller 152 is independent of and cooperates with the host controller/processor. Typically, the in-band controller 152 can instruct the chipset to power up, power down, transmit or receive and provides other similar control over the chipset.

The in-band system further includes memory 154, such as one or more RAM, FLASH, ROM or other similar memory or combination of memory accessible by the in-band controller 152 and/or chipset 150. The memory can store instructions, data, operations, programs, protocols, control parameters and other similar data, information and instructions that can be accessed and utilized by the chipset 150 and in-band controller 152. The memory can be specific to the in-band system, can be part of the host device memory or a combination thereof.

The out-of-band system 144 additionally provides wireless communication to and/or from the station 140. However, the out-of-band system at least receives wireless communications at frequencies outside of the bandwidth utilized by the in-band system 142 and/or out-of-band modulation. For example, if the in-band system is communicating over one or more 802.11 based channels (e.g., defined between 2.40 GHz and 2.50 GHz), the out-of-band system 144 can communicate through a 916 MHz frequency band or other band outside the band utilized by the in-band system 142. In some embodiments, the out-of-band communication is communicated at frequencies, data rates and/or reliabilities that are significantly lower than that of in-band communications. This allows for a simplified implementation with low power consumption requirements.

Alternatively and/or additionally, some embodiments provide the out-of-band communication in the same frequency channel as other in-band communications, but using a different modulation scheme in modulating the out-of-band communication. In these embodiments the power on signal can be viewed as "virtually" out of band, because it is in the same frequency band, but in a different modulation "band". As a result, the in-band signals can easily be distinguished from the out-of-band signals modulated with the out-of-band modulation scheme. The in-band receiving circuit or system would be unable to demodulate the out-of-band signals, and similarly, the out-of-band receiver system would be unable to demodulation the in-band signals. The out-of-band communication would appear as noise to the in-band receiving system and the in-band communication would appear as noise to the out-of-band receiving system. In some embodiments, the out-of-band signals can be generated at out-of-band frequencies as well as through different modulation "bands."

The out-of-band system 144 typically includes an out-of-band controller 160, which can be implemented through a process, microprocessor, computer or other similar controller. In preferred embodiments, the out-of-band controller is a low power consumption controller, and in some embodiments, the out-of-band controller is a microcontroller with low computation power as well as low power consumption requirements. Preferably, the out-of-band system 144 includes an independent out-of-band controller 160. This independent out-of-band controller allows the out-of-band system to operate independent of the in-band system and the host device controller and as such, the host device does not have to maintain the host controller and/or processor in a powered on state. When the in-band system is powered down in the sleep mode, the host controller, if different from the in-band controller, and other host components can also be powered down. However, the out-of-band controller 160 and the in-band controller 152 can be implemented through a single controller.

The out-of-band system 144 further includes an out-of-band receiver and/or transceiver 162. The receiver/transceiver is preferably implemented as a simple low power receiver/transceiver, such as a simple ISM band (industrial, science and medial band) transceiver, operating in a band outside the band defined for communication through the in-band system 142, such as in the 916 MHz band. In some embodiments, a station (e.g., station 106) only needs to receive out-of-band communications. However, in some embodiments, the station can receive and communicate with the access point (or other device) over the out-of-band channel(s).

The out-of-band system 144 further includes out-of-band memory 164, which can be implemented through one or more of RAM, FLASH, ROM or other similar memory accessible by the out-of-band controller 160 and/or receiver/transceiver 162. In some embodiments, the memory 164 is incorporated within the out-of-band controller 160. The memory can store instructions, data, operations, programs, protocols, control parameters and other similar data, information and instructions that can be accessed and utilized by the out-of-band controller 160 or receiver/transceiver 162. In some embodiments, the out-of-band memory 164 and in-band memory 154 can be a single memory shared by both the in-band and out-of-band systems 142 and 144.

Still referring to FIG. 2, the station 140 further includes a power source 146. The power source provides power to the in-band and out-of-band systems 142, 144, respectively. Alternatively, the station 140 can include two separate power sources, one for the in-band system and one for the out-of-band system. The power source 146 can be a battery, power cell, external power source (e.g., wall socket or power from a vehicle) and substantially any other power source or combination of power sources.

In operation, the station 140 transitions the in-band system 142 from an active mode to a sleep or off mode when the station 140 is not receiving and/or transmitting in-band communications. As discussed above, many wireless devices are actively receiving or transmitting wireless communications only a small fraction of the time, while the remainder of time the device is waiting to receive communications or to transmit communications. Maintaining wireless devices in an active state while waiting to receive and/or transmit is a significant and wasted drain on power. As such, these embodiments maintain the in-band system 142 in the sleep state while the station 140 is waiting to receive and/or transmit wireless in-band communications.

While the in-band system is in the sleep mode, the components of the in-band system are powered down limiting the power consumption. In some embodiments, the components associated with in-band wireless communication are completely powered off, and as such produce no power drain. However, in some embodiments, it may be beneficial to maintain some of the components of the in-band system 142 powered up or partially powered up. Further, while the in-band system 142 is in the sleep mode, the out-of-band system 144 is in an active mode and at least waiting to receive a wireless communication over an out-of-band control channel with a notification that another device of the network 100 has in-band communication to be transmitted to the station 140. The out-of-band notification can be communicated to the out-of-band system at data rates significantly lower than typical data rates of the in-band communications.

The out-of-band receiver 162 receives the out-of-band notification and forwards the notification to the out-of-band controller 160. The out-of-band controller processes the notification according to predefined instructs (for example, instructions retrieved from the memory 164). In some embodiments, the out-of-band controller verifies that the out-of-band notification is intended for the station 140. This verification can be determined by an address of the out-of-band communication or other similar identification and/or verification procedures.

If the notification is verified for the station 140, the out-of-band controller signals the in-band system 142. In some embodiments, the out-of-band controller 160 communicates with the in-band controller 152. The in-band controller initiates a power up and transitions the in-band system 142 from the sleep mode to the active mode. Once in the active mode, the in-band system 142 communicates with the remote device of the wireless sub-network 130 and/or network 100 through the in-band channel(s) as is known in the art.

In some embodiments, when the in-band system is in the active mode, the out-of-band system is transitioned to a sleep mode powering down the components of the out-of-band system. This does not adversely affect the operation of the station as remote devices of the network 100 can communicate directly with the in-band system. This provides further power savings.

Figure 3:
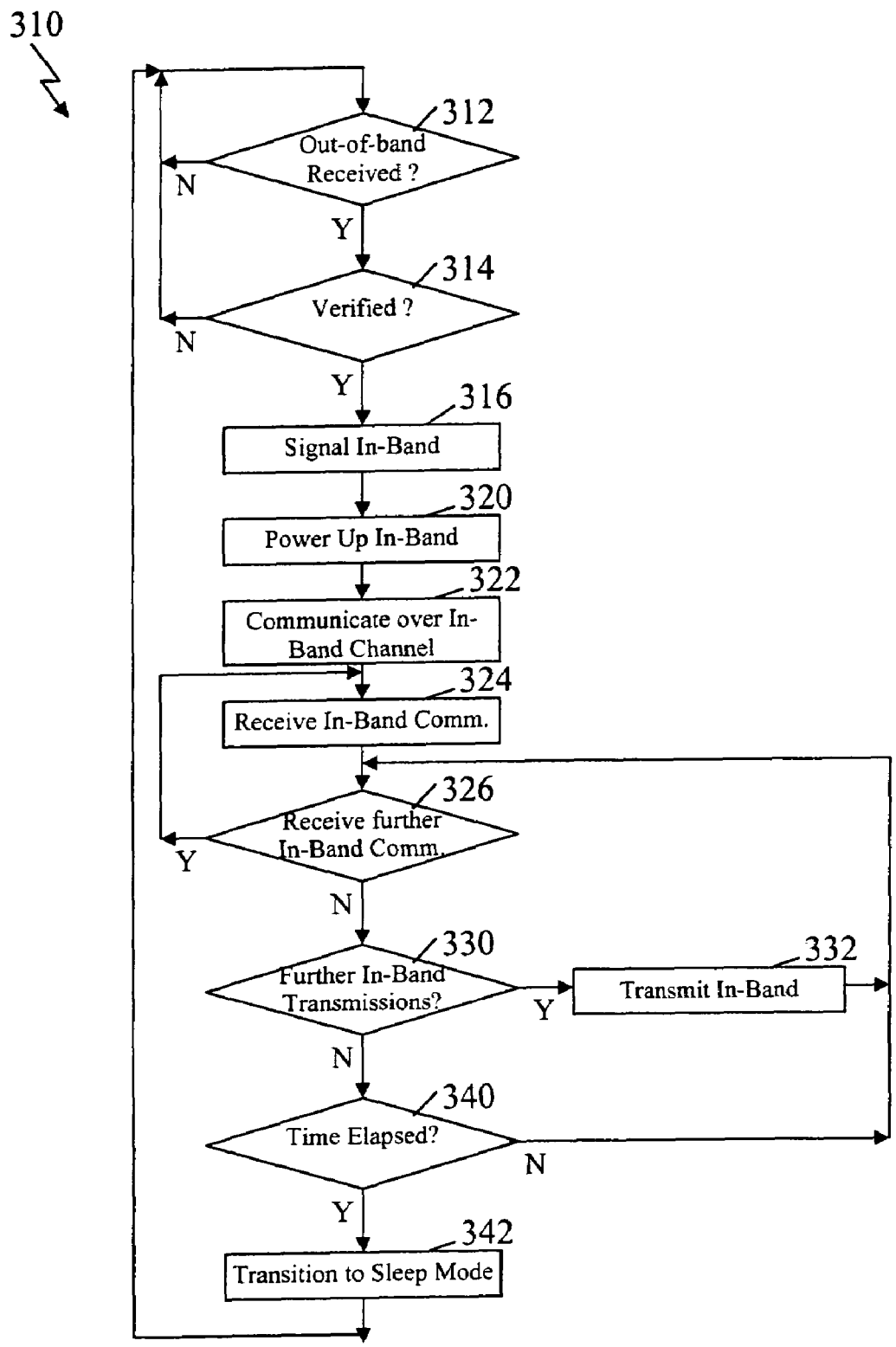
FIG. 3 depicts a simplified flow diagram of a process for operating a wireless device incorporating an in-band system and out-of-band system similar to those shown in FIG. 2 to provide reduced power consumption.

FIG. 3 depicts a simplified flow diagram of a process 310 for operating a wireless device incorporating an in-band system and out-of-band system providing reduced power consumption. In step 312, it is determined if an out-of-band notification signal is received. If an out-of-band notification is not received, the process cycles back to step 312 until a notification is received. If an out-of-band notification is received, the process continues to step 314 where the target of the out-of-band notification signal is determined and/or verified. The determination and/or verification can be implemented through a number of different implementations, some of which are described fully below. However, if the out-of-band notification is not verified as intended for the receiving device, the process returns to step 312.

If the out-of-band notification is verified, step 316 is entered where the out-of-band system 144 signals the in-band system 142 to transition from the powered down or sleep mode to the active mode. In step 320, the in-band system is powered up. In step 322, the in-band system communicates an in-band authorization signal to the remote device (e.g., the AP) to commence transmission of the in-band communication if the remote device is not already transmitting the in-band communication. In step 324, the in-band system receives the one or more in-band communications.

In step 326, it is determined if further communications are to be received. If further in-band communications are to be received, the process returns to step 324. If it is determined that no further communications are to be received, the process 310 continues to step 330, where it is determined if any further in-band communications are to be transmitted from the device. If further transmissions are not to be initiated, the process proceeds to step 340. Alternatively, if further in-band transmissions are to take place, step 332 is entered, where the device transmits one or more communications. Following step 332, the process returns to step 326.

In step 340, it is determined if a predefined period of time has elapsed since the last received in-band communication and/or last in-band communication was transmitted. If the predefined period has not expired, the process 310 returns to step 326. If the period has expired, step 342 is entered, where the in-band system transitions from the active mode to the sleep mode powering down at least the components of the in-band system 142, and preferably other components of the wireless device. The process then returns to step 312 to continue to await further out-of-band notification signals.

In some embodiments, at step 320, following the powering up of the in-band system, the out-of-band system is transitioned to a sleep mode while the in-band system is in the active mode. In these embodiments, step 342 further includes transitioning the out-of-band system from the sleep mode to an active mode prior to or while transitioning the in-band system from the active mode to the sleep mode.

In some embodiments, the out-of-band system verifies that the received out-of-band communication is directed to the wireless device housing the out-of-band system. This verification can be achieved in any number of ways. In some embodiments, the out-of-band communication includes a unique destination device identification. For example, this identification can be a MAC address of the 802.11 chipset 150 of the in-band system, a previously defined identifier, or other similar identification. In alternative embodiments, multiple out-of-band channels are utilized, with each out-of-band channel being dedicated to one station or a single wireless device of a wireless sub-network 130. As such, the out-of-band communications are verified as intended for the wireless device when the out-of-band communication is received over the predefined dedicated channel.

In some embodiments, an out-of-band communication can be formatted to include a basic "power on" frame. This basic power on frame can be simple signal and can be substantially the same each time it is transmitted. Once any one of the out-of-band systems of a network or sub-network 130 detects this power on frame, the detecting out-of-band system performs an interrogation of the remote sending device. This interrogation can include the out-of-band system transmitting further communications over the out-of-band channel(s) to the remote sending device (e.g., access point 102) to determine which target device is being addressed. The remote sending device transmits an out-of-band reply to designate which of the devices is being targeted. As such, only the one or more devices being targeted are identified/notified. The one or more identified target devices being addressed can then transition their respective in-band system to the active mode. In utilizing this basic power on frame, the power frame can be a very simple signal and/or detection, such as the out-of-band system simply detecting a received power in the out-of-band frequency band (or different modulation). This simple implementation can result in further reduced power consumption.

Figure 4:
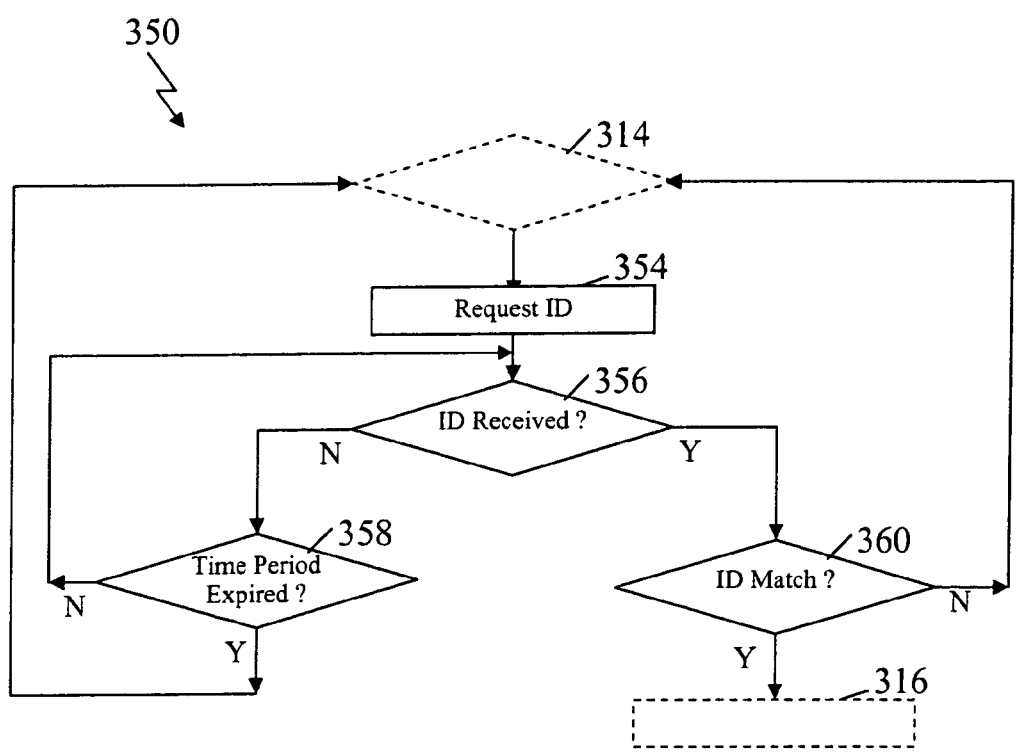
FIG. 4 depicts a simplified flow diagram of a process for verifying that a received out-of-band notification is targeted to the receiving device that can be implemented in the process of FIG. 3.

FIG. 4 depicts a simplified flow diagram of a process 350 for verifying that a received out-of-band notification is targeted to the receiving device. This verification process is one example of an implementation for step 314 in process 310 of FIG. 3. Initially an out-of-band communication is received (step 312 of FIG. 3), where the out-of-band communication is a basic power on frame. In step 354, the out-of-band system detects the basic power on frame and transmits over one or more out-of-band channels a request for identification. In step 356, it is determined if the out-of-band system receives an identification over the out-of-band channel. If not, the process 350 continues to step 358 where it is determined if a predefined period has expired. If the period has not expired, the process returns to step 356. If a predefined period has expired, the process simply returns to step 312 (see FIG. 3) to await further out-of-band communications.

If it is determined, in step 456, that an identification has been received, the process continues to step 360 where it is determined if the identification matches an identification of the in-band system and/or the present wireless device. If the identification does not match the in-band system and/or the device the process returns to step 312 of FIG. 3. If the identification does match the in-band system and/or the device, the out-of-band communication is verified and the process continues to step 316 of FIG. 3 to activate the in-band system.

In some embodiments where a general or generic out-of-band power on signal (for example, a signal that is almost always the same) is communicated over the network, each device of a sub-network or network with an out-of-band system that receives the power on signal can initiate a transition of their associated in-band systems from the sleep mode to the active mode. Once the in-band systems are activated, the in-band channels can be utilized by each device to communicate with the sending device to determine which one or more of the devices are the actual target device(s). The target device(s) maintains the in-band system in the active mode, while the devices not being targeted transition the in-band system back to the sleep mode and maintain (or activate) the out-of-band system active to detect further out-of-band communications.

In some embodiments, power consumption is further reduced by transitioning the out-of-band system 144 between a sleep mode and an active mode. For example, the out-of-band system can periodically be transitioned from the sleep mode to the active mode to check for out-of-band communications directed to the device housing the out-of-band system. In this configuration, the sending device can transmit the out-of-band power on communication or packet continuously, typically for a predefined period of time. This avoids the need to synchronize the sending device and the target device in the out-of-band channel. Because the out-of-band communications are communicated at one or more frequency spectrums (or modulation schemes) that are different than the in-band channel(s) (e.g., 802.11 based channel), the continuous communication of the out-of-band power on communication would not interfere with communications over the in-band channel(s).

In some embodiments, the out-of-band system does not activate the in-band system upon the reception of an out-of-band notification (and verification). Alternatively, the out-of-band system activates a user-detectable signal or indication that notifies a user that an in-band communication is available. This gives a user the option of whether or not to power up the in-band system to receive the in-band communication.

The range or distance of communication of the out-of-band channel(s) typically corresponds with the range of the in-band channel(s) of the wireless device. Typically, it is not desirable to transition the in-band system to an active mode if the target device is beyond the in-band range. Further, if the range of the out-of-band channel(s) is greater than the range of the in-band channel(s), typically the power being consumed by the out-of-band system is greater than needed. However, in some embodiments, the range of out-of-band channel(s) is specifically designed to be greater than the range of the in-band channel(s). This allows the detection of an out-of-band notification, further notifying a user that there is an in-band communication attempting to be forwarded. This provides the user with an option to move the device closer to the transmitter rather than not receiving the in-band communication.

The out-of-band system 144 is preferably incorporated into and part of a wireless device, such as a laptop, wireless phone and the like. However, the out-of-band system can be an after market device. As such, it is coupled with the wireless device, for example through an external port, to allow the wireless device to be powered down until activated by the external out-of-band system.

Figure 5:
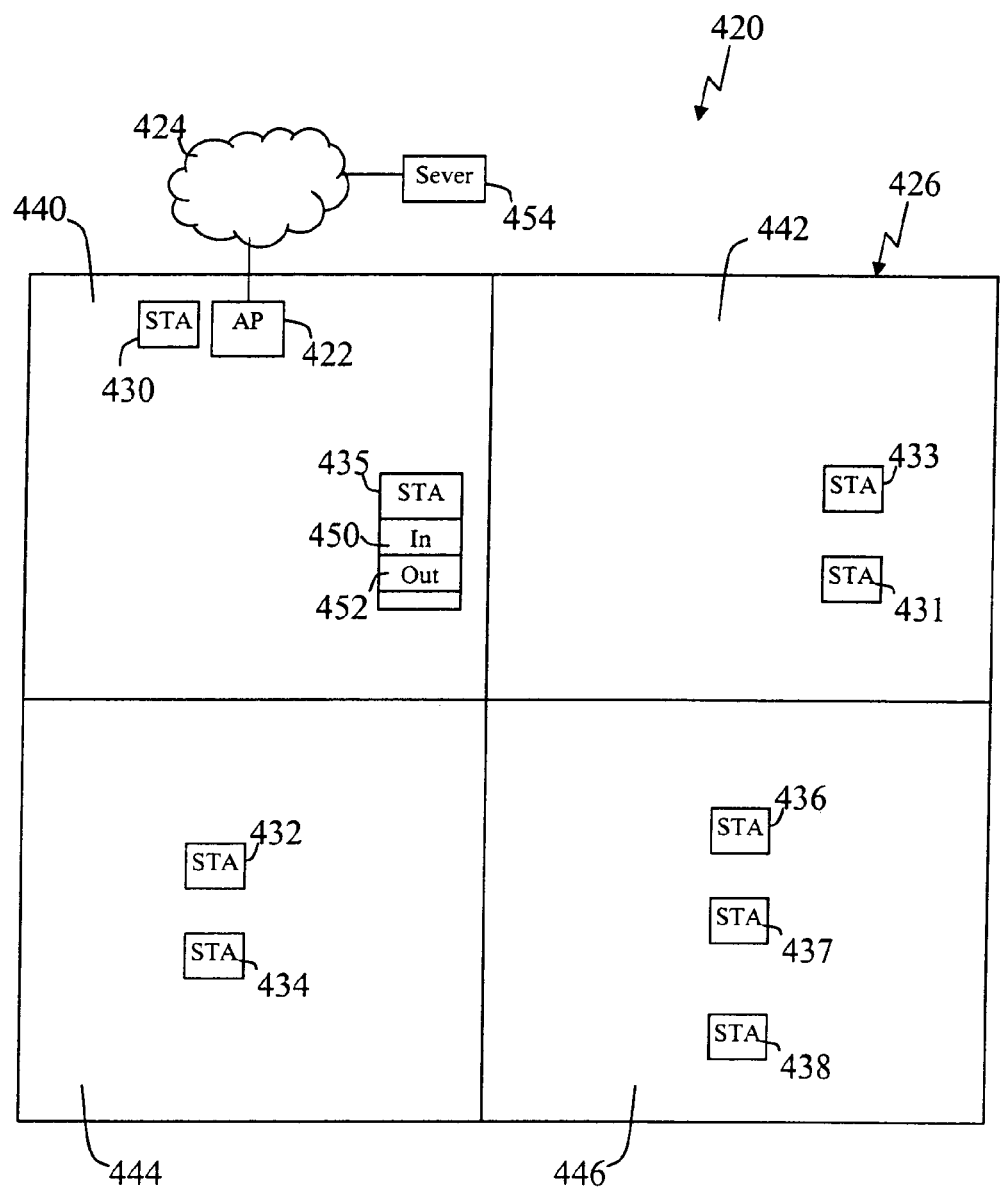
FIG. 5 depicts a simplified block diagram of an in-home or in-office wireless network that employs wireless devices utilizing in-band and out-of-band systems similar to those described above in reference to FIG. 2.

FIG. 5 depicts a simplified block diagram of an in-home or in-office wireless network 420 that employs wireless devices utilizing in-band and out-of-band systems similar to those described above in reference to FIG. 2. The in home network 420 includes a central access point 422 that couples with one or more external networks 424, such as the Internet, PSTN and/or other similar external networks. The network 420 includes a plurality of wireless stations 430–438 distributed throughout a home or office 426. For example, the central access point 424 can be located in a first room 440, such as a living room. A first station 430 can be position in the same room as the access point and wirelessly coupled with the access point. For example, the first station 430 can be a handheld Audio-Video display device that wirelessly receives suitably encoded television signals from the access point operating, at least in part, as a set-top-box. Similarly, a second station 431 in a second room 442 and a third station 432 in third room 444 can additional be televisions, each wirelessly receiving television signals through the access point 422.

A fourth station 433 in the second room 442 and a fifth station 434 in the third room 444 can be wireless phones accessing a PSTN network 424 through the access point. A sixth station 435 can be a laptop computer located in the first room 440 that accesses the Internet 424 wirelessly through the access point 422. Similarly, a seventh station 436 can be a computer that also wirelessly accesses the Internet through the access point. Further, both the sixth and seventh stations 435, 436 can wirelessly send documents to be printed by an eight station 437, a printer, through the access point. A ninth station 438 can be a music system capable of wirelessly receiving, through the access point, streaming music content retrieved over the Internet. The stations can be substantially any device that can wirelessly receive and/or transmit data or information with the access point. Further, each station 430–438 can include the in-band system and the out-of-band systems, similar to those described above.

In operation, for example, the sixth station 435 (e.g., a laptop) can access the Internet 424 through the access point 422. While the sixth station is not receiving content and or requesting content from the Internet, the in-band system 450 enters the sleep mode powering off at least the in-band communication system 450. The out-of-band system 452 remains active, or is activated if not previously active, to await communications from the Internet through the access point.

If a server 454 on the Internet wishes to communicate content to the laptop 435, the server 454 forwards a packet/data targeted to the laptop (e.g., using an Internet address). The access point 422 receives the packet and, in some embodiments, determines which of the stations is to receive the packet. The access point generates an out-of-band notification directed to the sixth station 435. The out-of-band system 452 of the laptop wirelessly receives the out-of-band notification over the out-of-band control channel. The out-of-band system 452 activates the in-band system 450. The in-band system powers up and wirelessly communicates over the in-band channel with the access point requesting the packet/data. The access point can then wirelessly communicate the packet/data to the sixth station 435 over the in-band channel(s).

The other stations 430–434 and 436–438 can similarly include in-band systems and out-of-band systems to reduce power consumption when the stations are not receiving and/or transmitting communications through the access point 422. Because the out-of-band systems are configured to operate with minimal power requirements, and that the in-band systems are powered down or operate at a significantly reduced power in the sleep mode, the stations have a significantly reduce power consumption, and significantly improve battery/cell life.

While these embodiments have been described by means of specific embodiments and applications thereof, numerous modifications and variations could be made thereto by those skilled in the art without departing from the scope of the invention set forth in the claims.

What is claimed is:

1. An apparatus for use in wireless communication, comprising:
    an in-band system providing in-band wireless communication, wherein the in-band system has an active mode and a sleep mode; and
    an out-of-band system providing out-of-band wireless communication, wherein the out-of-band system comprising an out-of-band transceiver is coupled with the in-band system, and the out-of-band transceiver receives an out-of-band wireless communication and the out-of-band transceiver transmits an out of band communication such that the out-of-band system activates the in-band system causing the in-band system to transition from the sleep mode to the active mode.

2. The apparatus of claim 1, wherein the out-of-band system includes a controller, such that a least a portion of the out-of-band wireless communication is directed to the controller and the controller activates the in-band system causing the in-band system to transition from the sleep mode to the active mode.

3. The apparatus of claim 2, wherein the controller further transmits an out-of-band communication.

4. The apparatus of claim 3, wherein the controller awaits an out-of-band wireless communication reply to the transmit out-of-band communication prior to activating the in-band system.

5. The apparatus of claim 1, wherein the out-of-band system is maintained in a sleep mode for a period of time and further is configured to be active for a period of time.

6. The apparatus of claim 1, wherein the out-of-band wireless communication is received over an out-of-band channel.

7. The apparatus of claim 6, wherein the out-of-band communication is received at a frequency spectrum different than an in-band wireless communication.

8. The apparatus of claim 1, wherein the in-band system is completely powered down when operating in the sleep mode.

9. The apparatus of claim 8, wherein the in-band system includes an in-band controller, such that the in-band controller is powered down when the in-band system is in the sleep mode.

10. A wireless communication device, comprising;
    an in-band system; and
    an out-of-band system comprising a transceiver coupled with the in-band system, wherein the out-of-band system activates the in-band system when the out-of-band system wirelessly receives an out-of-band communication and the transceiver wirelessly transmits an out-of-band interrogation such that the in-band system provides wireless in-band communication.

11. The wireless communication device of claim 10, wherein the in-band system has a sleep mode and an active mode, such that the in-band system transitions from the sleep mode to the active mode when activated by the out-of-band system.

12. The wireless device of claim 11, further comprising:
    an access point wirelessly coupled with the out-of-band system, wherein the access point generates the out-of-band wireless communication.

13. The wireless device of claim 11, further comprising:
    a host processor that is powered down when the in-band system is in the sleep mode.

14. A method for use in wireless communications, comprising;
    maintaining an in-band system in a sleep mode;
    receiving a wireless out-of-band communication;
    transmitting a wireless out-of-band communication in response to receiving the out-of-band communication;
    activating the in-band system in response to the out-of-band communication; and
    transitioning the in-band system from the sleep mode to an active mode.

15. The method of claim 14, wherein the receiving the out-of-band communication includes receiving the out-of-band communication through an out-of-band system.

16. The method of claim 14, wherein the maintaining the in-band system in the sleep mode includes completely powering down the in-band system.

17. The method of claim 14, further comprising verifying a target device of the out-of-band communication, and initiating the activating of the in-band system when the target device is verified as the intended target.

18. The method of claim 17, wherein the verifying the target device is the intended target includes transmitting an out-of-band identification request; and
    receiving an out-of-band reply containing an identification.

19. The method of claim 14, further comprising:
    transitioning the in-band system from the active mode to the sleep mode following reception of in-band out-of-band communications.

20. The apparatus of claim 19, wherein the out-of-band communication is modulated with a different modulation scheme than a modulation scheme for an in-band wireless communication.

UNITED STATES PATENT AND TRADEMARK OFFICE
CERTIFICATE OF CORRECTION

PATENT NO. : 6,980,839 B2
DATED : December 27, 2005
INVENTOR(S) : daCosta

It is certified that error appears in the above-identified patent and that said Letters Patent is hereby corrected as shown below:

<u>Title page,</u>
Item [22], PCT Filed, change "October 23, 2003" to -- October 29, 2003 --.

Signed and Sealed this

Twenty-third Day of May, 2006

JON W. DUDAS
*Director of the United States Patent and Trademark Office*

UNITED STATES PATENT AND TRADEMARK OFFICE
CERTIFICATE OF CORRECTION

PATENT NO. : 6,980,839 B2 Page 1 of 1
APPLICATION NO. : 10/697366
DATED : December 27, 2005
INVENTOR(S) : daCosta It is certified that error appears in the above-identified patent and that said Letters Patent is hereby corrected as shown below:

Column 11, line 49, change "out of band" to --out-of-band--.

Column 12, line 60, delete "in-band".

Signed and Sealed this

Eighth Day of August, 2006

JON W. DUDAS
*Director of the United States Patent and Trademark Office*